United States Patent
Jiang et al.

(10) Patent No.: US 11,784,306 B2
(45) Date of Patent: Oct. 10, 2023

(54) NEGATIVE ELECTRODE, ELECTROCHEMICAL DEVICE, AND ELECTRONIC DEVICE

(71) Applicant: Ningde Amperex Technology Limited, Ningde (CN)

(72) Inventors: Bing Jiang, Ningde (CN); Kefei Wang, Ningde (CN)

(73) Assignee: Ningde Amperex Technology Limited, Ningde (CN)

(*) Notice: Subject to any disclaimer, the term of this patent is extended or adjusted under 35 U.S.C. 154(b) by 278 days.

(21) Appl. No.: 17/215,484

(22) Filed: Mar. 29, 2021

(65) Prior Publication Data
US 2022/0123288 A1    Apr. 21, 2022

(30) Foreign Application Priority Data

Oct. 15, 2020  (CN) .......................... 202011101054.9

(51) Int. Cl.
| | | |
|---|---|---|
| *H01M 4/38* | (2006.01) | |
| *H01M 4/62* | (2006.01) | |
| *H01M 4/66* | (2006.01) | |
| *H01M 10/056* | (2010.01) | |
| *H01M 10/0562* | (2010.01) | |

(Continued)

(52) U.S. Cl.
CPC .......... *H01M 4/386* (2013.01); *H01M 4/625* (2013.01); *H01M 4/664* (2013.01); *H01M 10/056* (2013.01); *H01M 10/0562* (2013.01); *H01M 10/0566* (2013.01); *H01M 2004/021* (2013.01); *H01M 2004/027* (2013.01); *H01M 2300/0068* (2013.01)

(58) Field of Classification Search
CPC ............ H01M 4/38; H01M 4/66; H01M 4/62; H01M 4/60
See application file for complete search history.

(56) References Cited

U.S. PATENT DOCUMENTS

2013/0045419 A1* 2/2013 Chun .................... C01B 33/146
423/325
2016/0359196 A1* 12/2016 Kim ................. H01M 10/0525
(Continued)

FOREIGN PATENT DOCUMENTS

| CN | 103764561 A | 4/2014 |
|---|---|---|
| CN | 110265625 A | 9/2019 |

(Continued)

OTHER PUBLICATIONS

First Office Action dated May 31, 2021, in corresponding Chinese Application No. 202011101054.9, 14 pages.

(Continued)

*Primary Examiner* — Kenneth J Douyette
(74) *Attorney, Agent, or Firm* — Maier & Maier, PLLC (57) ABSTRACT

A negative electrode includes a current collector and an active substance layer arranged on the current collector, and an ionic conductivity of the active substance layer is 0.01 S/m to 1 S/m. The ionic conductivity of the active substance layer is defined as 0.01 S/m to 1 S/m, so that the electrochemical device can meet requirements for fast charging, and meanwhile, lithium plating on a surface of the negative electrode of the electrochemical device can be inhibited in a fast-charging condition, ensuring safety performance of the electrochemical device.

18 Claims, 1 Drawing Sheet

(51) Int. Cl.
*H01M 10/0566* (2010.01)
*H01M 4/02* (2006.01)

(56) References Cited

U.S. PATENT DOCUMENTS

2018/0323439 A1* 11/2018 Kimura ............... H01M 10/052
2019/0157682 A1* 5/2019 Ho ...................... H01M 4/1395

FOREIGN PATENT DOCUMENTS

| CN | 110690436 A | 1/2020 |
| KR | 1020190066867 A | 6/2019 |
| KR | 1020200073801 A | 6/2020 |

OTHER PUBLICATIONS

European Search Report dated Aug. 26, 2021, in corresponding European Application No. EP21165302.7, 9 pages.
Huang et al., "Synthesis of Porous Si/C7 Composite Nanosheets from Vermiculite with a Hierarchical Structure as a High-Performance Anode for Lithium-Ion Battery", Applied Materials & Interfaces, vol. 11, No. 30, Jul. 16, 2019, XP05583512, pp. 26854-26862.

* cited by examiner

NEGATIVE ELECTRODE, ELECTROCHEMICAL DEVICE, AND ELECTRONIC DEVICE

CROSS REFERENCE TO RELATED APPLICATIONS

The present application claims the benefit of priority from the China Patent Application No. 202011101054.9, filed on 15 Oct. 2020, the disclosure of which is hereby incorporated by reference in its entirety.

TECHNICAL FIELD

This application relates to the field of electrochemical energy storage, and in particular, to a negative electrode, an electrochemical device, and an electronic device.

BACKGROUND

As the demand for electrochemical devices (for example, lithium-ion batteries) increases, people have increasingly higher requirements for fast charging performance and safety performance of electrochemical devices. During charging, lithium ions are intercalated in negative electrodes of the electrochemical devices. If lithium ions are not intercalated in time, lithium plating may occur on the surfaces of the negative electrodes, and even lithium dendrites may be generated. The generated lithium dendrites may penetrate the separator, causing a risk of short-circuit. Therefore, there is a need to further improve the fast charging performance and safety performance of the electrochemical device.

SUMMARY

Embodiments of this application improve fast charging performance and safety performance of an electrochemical device by increasing an ionic conductivity of an active substance layer.

An embodiment of the application provides a negative electrode, including a current collector and an active substance layer. The active substance layer is arranged on the current collector, where an ionic conductivity of the active substance layer is 0.01 S/m to 1 S/m.

In some embodiments, a porosity of the active substance layer is 20% to 40%, and in some embodiments, the porosity of the active substance layer is 25% to 35%.

In some embodiments, the active substance layer includes an active substance and a porous material. A ratio of an average particle size of the active substance to that of the porous material is less than or equal to 0.8, and in some embodiments, the ratio of the average particle size of the active substance to that of the porous material is less than or equal to 0.6.

In some embodiments, the active substance layer includes an active substance and a porous material. A ratio of an average particle size of the active substance to that of the porous material is 1.3 to 3.8, and in some embodiments, the ratio of the average particle size of the active substance to that of the porous material is 1.5 to 2.5. In some embodiments, an average particle size of the active substance is 15 µm to 70 µm, and in some embodiments, the average particle size of the active substance is 15 µm to 30 µm. In some embodiments, an average particle size of the porous material is less than 100 µm, and in some embodiments, the average particle size of the porous material is less than or equal to 85 µm. In some embodiments, the porous material includes at least one of porous ceramics, activated carbon, meso-carbon microbeads (MCMB), conductive carbon, or Halloysite nanotubes. In some embodiments, the active substance includes graphite and/or a silicon-based material. In some embodiments, the content of the porous material is 0.5% to 20% of the active substance layer by mass. In some embodiments, a specific surface area of the porous material is greater than 1.5 $m^2/g$.

Another embodiment of this application provides an electrochemical device, including any one of the above-mentioned negative electrodes.

In some embodiments, the electrochemical device further includes an electrolyte, where the electrolyte includes a compound containing a sulfur-oxygen double bond.

In some embodiments, the compound containing a sulfur-oxygen double bond includes at least one of cyclic sulfate, chain sulfate, chain sulphonate, cyclic sulphonate, chain sulfite, or cyclic sulfite.

In some embodiments, the compound containing a sulfur-oxygen double bond includes at least one of the following compounds represented by formula 1:

formula 1 where W is selected from

L is selected from a single bond or methylene;
m is an integer ranging from 1 to 4;
n is an integer ranging from 0 to 2; and
p is an integer ranging from 0 to 6.

In some embodiments, the compound represented by formula 1 is selected from at least one of the following compounds:

In some embodiments, 1.4≤y×100/S≤3.6; y is a mass percentage of the compound containing a sulfur-oxygen double bond in the electrolyte, and S is a specific surface area of the negative electrode in $m^2/g$.

An embodiment of this application further provides an electronic device, including any one of the above-mentioned electrochemical devices.

According to the embodiments of this application, the ionic conductivity of the active substance layer is defined as 0.01 S/m to 1 S/m, so that the electrochemical device can meet requirements for fast charging, and meanwhile, substantially no lithium plating or only slight lithium plating occurs on a surface of the negative electrode of the electrochemical device in a fast-charging condition, thus avoiding a risk of short-circuit caused by lithium plating, and ensuring the safety performance of the electrochemical device in the fast-charging condition.

DETAILED DESCRIPTION OF EMBODIMENTS

The following embodiments may enable those skilled in the art to understand this application more comprehensively, but do not limit this application in any way.

Figure 1:
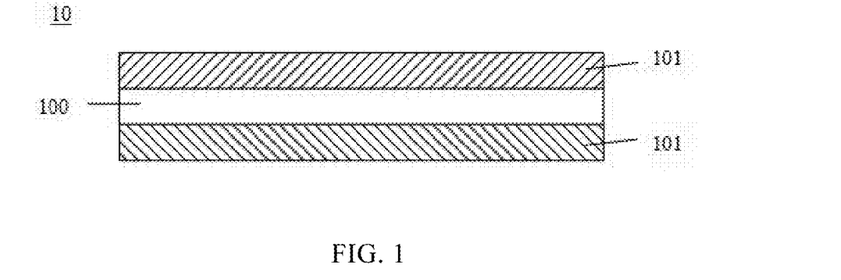
FIG. 1 shows a sectional view of a negative electrode according to an embodiment of this application.

FIG. 1 shows a sectional view of a negative electrode 10 according to an embodiment of this application. The negative electrode 10 includes a current collector 100 and an active substance layer 101 arranged on the current collector 100. It should be understood that the active substance layer 101 in FIG. 1 is shown as being located on two sides of the current collector 100, which is merely an example and not for limitation. The active substance layer 101 may alternatively be arranged only on one side of the current collector 100.

In some embodiments, an ionic conductivity of the active substance layer 101 is 0.01 S/m to 1 S/m. If the ionic conductivity of the active substance layer 101 is too small, for example, less than 0.01 S/m, in a fast-charging condition of an electrochemical device, lithium plating is easy to occur on a surface of the negative electrode 10, and even lithium dendrites may be formed. The lithium dendrites may penetrate a separator, causing a risk of short-circuit. The ionic conductivity of the active substance layer 101 is defined as 0.01 S/m to 1 S/m, so that the electrochemical device formed with the negative electrode 10 can meet requirements for fast charging, and meanwhile, substantially no lithium plating or only slight lithium plating occurs on the surface of the negative electrode 10 of the electrochemical device in a fast-charging condition, thus avoiding the risk of short-circuit caused by lithium plating, and ensuring safety performance of the electrochemical device in the fast-charging condition.

In some embodiments, a porosity of the active substance layer 101 is 20% to 40%. If the porosity of the active substance layer 101 is too small, for example, less than 20%, it will not be able to provide sufficient permeation channels for the electrolyte, reducing an intercalation rate of lithium ions, so that fast charging performance of the electrochemical device is affected, and lithium plating is easy to occur on the surface of the negative electrode 10. If the porosity of the active substance layer 101 is too large, a volumetric energy density of the electrochemical device may be affected. In some embodiments, a porosity of the active substance layer 101 is 25% to 35%. The porosity of the active substance layer 101 is set as 25% to 35%, so that influence to the volumetric energy density of the electrochemical device can be minimized while satisfying fast intercalation of lithium ions.

In some embodiments, the active substance layer 101 may include an active substance and a porous material. In some embodiments, the active substance may include graphite and/or a silicon-based material. In some embodiments, the active substance includes, but is not limited to, at least one of artificial graphite, natural graphite, hard carbon, silicon alloy, tin alloy, or pure silicon. In some embodiments, the porous material may include, but is not limited to, at least one of porous ceramics, activated carbon, meso-carbon microbeads (MCMB), conductive carbon, or Halloysite nanotubes.

In some embodiments, a ratio of an average particle size of the active substance to that of the porous material is less than or equal to 0.8. In some embodiments, a ratio of an average particle size of the active substance to that of the porous material is 1.3 to 3.8. In some embodiments, when an average particle size of the active substance is less than that of the porous material, a ratio of the average particle size of the active substance to that of the porous material is less than or equal to 0.6. This is because in a process of particle stacking, particles having a certain particle size difference are prone to form a close-stacked structure, and especially, large particles of the porous material are prone to be filled and surrounded by the active substance in small particles, so that a contact area is indirectly expanded, and more excellent ionic conductivity and lithium plating status are achieved. Similarly, when a particle size of the active substance is greater than that of the porous material, the ratio of the particle size of the active substance to that of the porous material is 1.5 to 2.5. Particles having a certain particle size difference are prone to form a close-stacked structure, that is, in such case, large particles of the active substance are prone to be filled with the porous material in small particles, so that the contact area is indirectly expanded, and more excellent ionic conductivity and lithium plating status are achieved. When the ratio of the particle size of the active substance to that of the porous material is further increased, the particle size of the porous material is too small, the porous material is prone to be agglomerated and fully buried by the particles of the active substance. Thus, the function of providing porechannels cannot be achieved, resulting in reduction of the ionic conductivity and deterioration of lithium plating status.

In some embodiments, an average particle size of the active substance and an average particle size of the porous material are obtained through statistical average particle sizes acquired from electron microscope pictures. Specific steps may be included as follows:

A sample was spread on a sample test stage; pictures of the sample were taken through a scanning electron microscope; image analysis software was used to randomly select 10 particles of the active substance or the porous material from SEM pictures, and respective areas of these particles of the active substance or the porous material were solved; next, by assuming that the particles of the active substance or the porous material were spherical, respective particle sizes R (diameters) were solved through the following formula:

$$R=2\times(S/\pi)^{1/2},$$

where S is the respective areas of the particles of the active substance or the porous material.

Respective particle sizes R of the particles of the active substance or the porous material from three SEM pictures were solved, arithmetic averaging was performed on the obtained particle sizes of the 30 (10×3) particles of the active substance or the porous material, so as to obtain an average particle size of the particles of the active substance or the porous material.

In some embodiments, an average particle size of the active substance is 15 μm to 70 μm. If the particle size of the active substance is too small, for example, less than 15 μm, a specific surface area of the active substance is large, and excessive electrolyte will be consumed. If the particle size of the active substance is too large, for example, greater than 70 μm, it is unfavorable to an increase of a compacted density of the negative electrode 10, thereby affecting a volumetric energy density of the electrochemical device.

In some embodiments, an average particle size of the porous material is less than 100 μm. If the particle size of the porous material is too large, it is unfavorable to an increase of a compacted density of the negative electrode 10, thereby affecting the volumetric energy density of the electrochemical device.

In some embodiments, mass content of the porous material in the active substance layer 101 is 0.5% to 20%. If the mass content of the porous material in the active substance layer 101 is too low, for example, lower than 0.5%, an effect of improving permeation channels of the electrolyte through the porous material to improve an intercalation rate of lithium ions is limited. If the mass content of the porous material in the active substance layer 101 is too high, for example, higher than 20%, content of the active substance in the active substance layer 101 is affected, which is unfavorable to the volumetric energy density of the electrochemical device.

In some embodiments, a specific surface area of the porous material is greater than 1.5 m²/g. If the specific surface area of the porous material is too small, for example, lower than 1.5 m²/g, an effect of improving permeation channels of the electrolyte may be weakened, which is also unfavorable to the increase of the volumetric energy density of the electrochemical device.

In some embodiments, the current collector 100 may use at least one of a copper foil, a nickel foil, or a carbon-based current collector, or certainly, may use other negative current collectors commonly used in the art. In some embodiments, the current collector 100 may be 1 μm to 200 μm in thickness.

In some embodiments, the active substance layer 101 may further include a conductive agent. The conductive agent in the active substance layer 101 may include at least one of conductive carbon black, Ketjen black, laminated graphite, graphene, carbon nanotubes, or carbon fiber. It should be understood that the foregoing disclosed materials are merely examples, and the active substance layer 101 may use any other suitable material. In some embodiments, the active substance layer 101 may further include a binder. In some embodiments, the binder in the active substance layer 101 may include at least one of polyvinylidene fluoride, a polyvinylidene fluoride-fluorinated olefin copolymer, polyvinylpyrrolidone, polyacrylonitrile, polymethyl acrylate, polytetrafluoroethylene, sodium carboxymethyl cellulose, styrene-butadiene rubber, polyurethane, fluorinated rubber, or polyvinyl alcohol. In some embodiments, a mass ratio of the active substance to the porous material to the conductive agent to the binder in the active substance layer 101 may be 72 to 98.5:0.5 to 20:0 to 3:1 to 5. It should be understood that the foregoing description is merely an example, and any other suitable mass ratio may be used. In some embodiments, a compacted density of the active substance layer 101 is 1.0 g/cc to 1.90 g/cc. If the compacted density of the active substance layer 101 is too small, for example, less than 1.0 g/cc, it is unfavorable to the volumetric energy density of the electrochemical device. If the compacted density of the active substance layer 101 is too large, for example, greater than 1.90 g/cc, it is unfavorable to permeation of the electrolyte.

In some embodiments, this application further provides an electrochemical device, including the above-mentioned negative electrode 10.

In some embodiments, the electrochemical device further includes an electrolyte, where the electrolyte includes a compound containing a sulfur-oxygen double bond.

In some embodiments, the compound containing a sulfur-oxygen double bond includes at least one of cyclic sulfate, chain sulfate, chain sulphonate, cyclic sulphonate, chain sulfite, or cyclic sulfite. The compound containing a sulfur-oxygen double bond in the electrolyte can form a full solid electrolyte membrane with high ion conduction on a surface of the negative electrode 10, thereby further increasing the ionic conductivity and improving fast charging performance and safety performance of the electrochemical device.

In some embodiments, the compound containing a sulfur-oxygen double bond includes at least one of the following compounds represented by formula 1:

formula 1 where W is selected from

L is selected from a single bond or methylene; m is an integer ranging from 1 to 4; n is an integer ranging from 0 to 2; and p is an integer ranging from 0 to 6. In some embodiments, the compound represented by formula 1 is selected from at least one of the following compounds:

In some embodiments, $1.4 \leq y \times 100/S \leq 3.6$; y is a mass percentage of the compound containing a sulfur-oxygen double bond in the electrolyte, and S is a specific surface area of the negative electrode 10 in $m^2/g$. When the relationship $1.4 \leq y \times 100/S \leq 3.6$ is satisfied, an ionic conductivity of the negative electrode 10 and an initial coulombic efficiency of the electrochemical device can be significantly improved, and lithium plating performance and a capacity retention ratio can be improved. If y is too small, for example, y×100/S is less than 1.4, an effect of the compound containing a sulfur-oxygen double bond in increasing the ionic conductivity is limited. If y is too large, for example, y×100/S is greater than 3.6, the solid electrolyte membrane formed on the surface of the negative electrode 10 by the compound containing a sulfur-oxygen double bond is too thick, which is unfavorable to transmission of lithium ions, resulting in reduction of the fast charging performance and safety performance of the electrochemical device.

In some embodiments, the electrochemical device includes a lithium-ion battery. However, this application is not limited to this. In some embodiments, the electrochemical device may further include an electrolyte. The electrolyte may be one or more of a gel electrolyte, a solid electrolyte, and the above-mentioned electrolyte. In some embodiments, the electrolyte may further include a lithium salt and a non-aqueous solvent. The lithium salt may be selected from one or more of $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiSiF_6$, LiBOB, or lithium difluoroborate. For example, $LiPF_6$ is used as the lithium salt because $LiPF_6$ can provide high ionic conductivity and improve a cycle characteristic.

The non-aqueous solvent may be selected from a carbonate compound, a carboxylate compound, an ether compound, any other organic solvent, or a combination thereof.

The carbonate compound may be selected from a linear carbonate compound, a cyclic carbonate compound, a fluorocarbonate compound, or a combination thereof.

The linear carbonate compound may be selected from diethyl carbonate (DEC), dimethyl carbonate (DMC), dipropyl carbonate (DPC), methyl propyl carbonate (MPC), ethyl propyl carbonate (EPC), ethyl methyl carbonate (MEC), or a combination thereof. An example of the cyclic carbonate compound is ethylene carbonate (EC), propylene carbonate (PC), butylene carbonate (BC), vinyl ethylene carbonate (VEC), or a combination thereof. The fluorocarbonate compound may be selected from fluoroethylene carbonate (FEC), 1,2-difluoroethylene carbonate, 1,1-difluoroethylene carbonate, 1,1,2-trifluoroethylene carbonate, 1,1,2,2-tetrafluoroethylene carbonate, 1-fluoro-2-methylethylene carbonate, 1-fluoro-1-methylethylene carbonate, 1,2-difluoro-1-methylethylene carbonate, 1,1,2-trifluoro-2-methylethylene carbonate, trifluoromethylethylene carbonate, or a combination thereof.

The carboxylate compound may be selected from methyl acetate, ethyl acetate, n-propyl acetate, tert-butyl acetate, methyl propionate, ethyl propionate, propyl propionate, γ-butyrolactone ester, caprolactone, valerolactone, mevalonolactone, caprolactone, methyl formate, or a combination thereof.

The ether compound may be selected from dibutyl ether, tetraglyme, diglyme, 1,2-dimethoxyethane, 1,2-diethoxyethane, ethoxymethoxyethane, 2-methyltetrahydrofuran, tetrahydrofuran, or a combination thereof.

Any other organic solvent may be selected from dimethyl sulfoxide, 1,2-dioxolane, sulfolane, methyl sulfolane, 1,3-dimethyl-2-imidazolidinone, N-methyl-2-pyrrolidone, formamide, dimethylformamide, acetonitrile, trimethyl phosphate, triethyl phosphate, trioctyl phosphate, phosphate ester, or a combination thereof.

Figure 2:
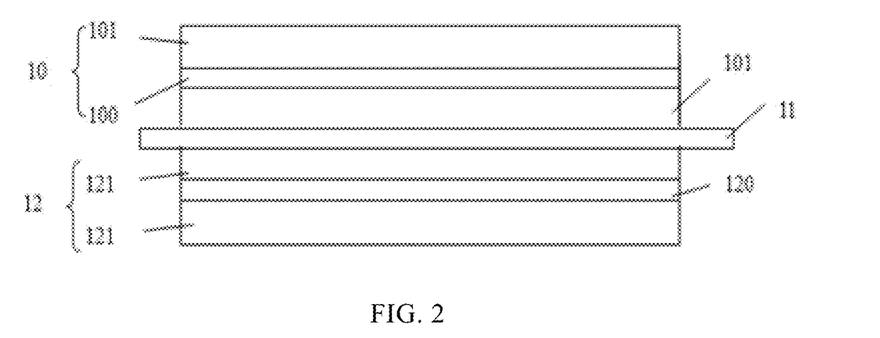
FIG. 2 shows a sectional view of an electrode assembly of an electrochemical device according to an embodiment of this application.

In some embodiments, as shown in FIG. 2, the electrochemical device may include the negative electrode 10, a separator 11, and a positive electrode 12, where the separator 11 is arranged between the positive electrode 12 and the negative electrode 10. In some embodiments, the separator 11 may include at least one of polyethylene, polypropylene, polyvinylidene fluoride, polyethylene terephthalate, polyimide, or aramid. For example, polyethylene includes at least one of high-density polyethylene, low-density polyethylene, or ultra-high-molecular-weight polyethylene. Particularly, polyethylene and polypropylene have a good effect on preventing short-circuit, and can enhance stability of a battery through the shutdown effect. In some embodiments, thickness of a separator 11 ranges from about 5 μm to 500 μm.

In some embodiments, the surface of the separator 11 may further include a porous layer. The porous layer is arranged on at least one surface of the separator 11 and includes inorganic particles and a binder, where the inorganic particles are selected from at least one of aluminum oxide ($Al_2O_3$), silicon oxide ($SiO_2$), magnesium oxide (MgO), titanium oxide ($TiO_2$), hafnium oxide ($HfO_2$), tin oxide ($SnO_2$), cerium dioxide ($CeO_2$), nickel oxide (NiO), zinc oxide (ZnO), calcium oxide (CaO), zirconium oxide ($ZrO_2$), yttrium oxide ($Y_2O_3$), silicon carbide (SiC), boehmite, aluminum hydroxide, magnesium hydroxide, calcium hydroxide, or barium sulfate. In some embodiments, a pore diameter of the separator 11 ranges from about 0.01 μm to 1 μm. The binder of the porous layer is selected from at least one of polyvinylidene fluoride, a vinylidene fluoride-hexafluoropropylene copolymer, polyamide, polyacrylonitrile, polyacrylate, polyacrylic acid, sodium carboxymethylcellulose, polyvinylpyrrolidone, polyvinyl ether, polymethyl methacrylate, polytetrafluoroethylene, or polyhexafluoropropylene. The porous layer on the surface of the separator 11 can improve heat resistance, oxidation resistance, and electrolyte infiltration performance of the separator 11, and enhance adhesion between the separator 11 and the electrode plate.

In some embodiments, the positive electrode 12 may include a current collector 120 and an active substance layer 121 arranged on the current collector 120. It should be understood that the active substance layer 121 in FIG. 2 is shown as being located on two sides of the current collector 120, which is merely an example. The active substance layer 121 may be arranged only on one side of the current collector 120. The current collector 120 of the positive electrode 12 may use an Al foil, or may use other current collectors commonly used in the art. In some embodiments, the current collector 120 may be 1 μm to 200 μm in thickness.

In some embodiments, the active substance layer 121 may include an active substance, a conductive agent, and a binder. In some embodiments, the active substance in the active substance layer 121 may include at least one of lithium cobalt oxide, lithium manganate oxide, lithium iron phosphate, lithium nickel cobalt manganese oxide, lithium nickel cobalt aluminum oxide, or lithium nickel manganese oxide. In some embodiments, the conductive agent in the active substance layer 121 may include at least one of conductive carbon black, Ketjen black, laminated graphite, graphene, carbon nanotubes, or carbon fiber. In some embodiments, the binder in the active substance layer 121 may include at least one of polyvinylidene fluoride, a polyvinylidene fluoride-fluorinated olefin copolymer, polytetrafluoroethylene, sodium carboxymethyl cellulose, styrene-butadiene rubber, polyurethane, fluorinated rubber, or polyvinyl alcohol. In some embodiments, a mass ratio of the active substance to the conductive agent to the binder in the active substance layer 121 may be 92 to 98.5:0.5 to 3:1 to 5. It should be understood that the above description is merely an example, and the active substance layer 121 may use any other suitable materials, thicknesses and mass ratios.

In some embodiments of this application, an electrode assembly of the electrochemical device is a winding type electrode assembly or a stacked type electrode assembly.

In some embodiments of this application, a lithium-ion battery is used as an example. A positive electrode, a separator, and a negative electrode are wound or stacked in sequence to form an electrode assembly, the electrode assembly is then packaged in an aluminum-plastic film, followed by injection of an electrolyte, formation, and packaging, so that the lithium-ion battery is prepared. Then, the prepared lithium-ion battery is subjected to performance tests.

Those skilled in the art will understand that the method for preparing the electrochemical device (for example, the lithium-ion battery) described above is merely an example. Without departing from the content of the disclosure of this application, other methods commonly used in the art may be used.

An embodiment of this application further provides an electronic device, including the foregoing electrochemical device. The electronic device according to this embodiment of this application is not particularly limited, and may be any known electronic device used in the prior art. In some embodiments, the electronic device may include, but is not limited to: notebook computers, pen-input computers, mobile computers, e-book players, portable phones, portable fax machines, portable copiers, portable printers, head-mounted stereo headsets, video recorders, liquid crystal display televisions, portable cleaners, portable CD players, mini discs, transceivers, electronic notebooks, calculators, memory cards, portable recorders, radios, backup power supplies, motors, automobiles, motorcycles, assisted bicycles, bicycles, lighting apparatuses, toys, game machines, clocks, electric tools, flashlights, cameras, large household storage batteries or lithium-ion capacitors.

Some specific examples and comparative examples are listed below to better illustrate this application. Lithium-ion batteries are used for illustration.

Example 1

Preparation of a positive electrode: A positive active substance lithium cobalt oxide, a conductive agent-conductive carbon black, and a binder polyvinylidene fluoride (PVDF) were dispersed in N-methylpyrrolidone (NMP) solution at a weight ratio of 97.6:1.1:1.3, to form a positive electrode slurry. An aluminum foil was used as a positive current collector, the positive current collector was coated with the positive electrode slurry with a thickness of 50 μm, followed by drying, cold pressing, and slitting, to obtain the positive electrode.

Preparation of a negative electrode: A negative active substance artificial graphite, a porous material meso-carbon microbeads, and a binder styrene-butadiene rubber were dispersed in deionized water at a weight ratio of 98.2:0.5:1.3, to form a negative electrode slurry. A copper foil with a thickness of 10 μm was used as a negative current collector, and the negative current collector was coated with the negative electrode slurry with a thickness of 60 μm, followed by drying, to obtain a negative active substance layer, which was then slitted to obtain the negative electrode.

Preparation of a separator: Polyethylene (PE) with a thickness of 8 μm was used as a base material of the separator, two sides of the base material of the separator were coated with aluminum oxide ceramic layers 2 μm in thickness, and finally, the two sides coated with the ceramic layers were respectively coated with 2.5 mg of binder polyvinylidene fluoride (PVDF), followed by drying.

Preparation of an electrolyte: In an environment with a water content less than 10 ppm, lithium hexafluorophosphate and a non-aqueous organic solvent (a weight ratio of ethylene carbonate (EC) to propylene carbonate (PC) to diethyl carbonate (DEC) was equal to 1:1:1) were mixed to prepare a basic electrolyte, where a concentration of $LiPF_6$ was 1.15 mol/L. In addition, in some examples, a certain amount of the compound represented by formula 1 may be added into the basic electrolyte. Preparation of a lithium-ion battery: The positive electrode, the separator, and the negative electrode were stacked in sequence, so that the separator was placed between the positive electrode and the negative electrode for isolation, and winding was performed to obtain an electrode assembly. The electrode assembly was arranged in an outer packaging aluminum-plastic film, and was dehydrated at a temperature of 80° C. After that, the abovementioned electrolyte was injected and packaged, followed by processes such as formation, degassing, and trimming, so that the lithium-ion battery was obtained.

Parameters for other examples and comparative examples were changed based on steps of Example 1. The specific parameter changes were shown in the table below. The following describes methods for testing various parameters of this application.

Method for Testing Ionic Conductivity
(1) An aluminum-plastic film, an electrode, and a separator were baked at a temperature of 60° C. for 4 hours before use.
(2) A die of a dimension 23×35×2 mm was prepared.
(3) A manufactured electrode was sheared, by ceramic scissors, into a piece larger than the die in dimension, the piece was cut on the die, and the die-cut electrode was taken out with tweezers for use.
(4) The electrode was used to prepare a single-layer symmetrical battery.
(5) The symmetrical battery was placed in an electrochemical workstation and subjected to an EIS test, where a frequency was set as 0.5 Hz to 200 kHz, and a disturbance voltage was set as 10 mV.
(6) An ion resistance Rion of the electrode was calculated through an intersection point of two straight lines of EIS.
(7) Ionic conductivity of the electrode=d (thickness of the electrode)/(Rion×A (area of the electrode)).

Method for Testing Average Particle Sizes of an Active Substance and a Porous Material A sample was spread on a sample test stage; pictures of the sample were taken by using a scanning electron microscope; image analysis software was used to randomly select 10 particles of an active substance from SEM pictures, respective areas of these particles of the active substance were solved; next, by assuming that the particles of the active substance were spherical, respective particle sizes R (diameters) were solved through the following formula:

$$R=2\times(S/\pi)^{1/2},$$

where S is the respective areas of the particles of the active substance.

Respective particle sizes R of the particles of the active substance from three SEM images was solved, and arithmetic averaging was performed to the particle sizes of the 30 (10×3) particles of the active substance, obtaining an average particle size D1 of the particles of the active substance.

An average particle size D2 of the porous material was tested by using the same method as was used for testing the average particle size of the active substance.

Method for Testing Porosity

The method for testing porosity of the electrode was performed by using a mercury intrusion porosimeter, specifically including:

(1) An electrode whose surface on one side was fully covered with the active substance layer was used as a sample.
(2) A density and a porosity of the sample were predicted, and a suitable dilatometer was chosen.
(3) The sample was first baked in an oven for 2 hours for dehydration, and the sample was weighed before analysis.
(4) The sample was placed in the dilatometer, followed by sealing and weighing, to obtain a weight of the sample and the dilatometer.
(5) The dilatometer was mounted in a low-pressure workstation, and low-pressure analysis was performed after low-pressure documents were edited.
(6) After the low-pressure analysis was completed, the dilatometer was taken out to weigh, which was a weight of the sample, the dilatometer, and mercury.
(7) The dilatometer was mounted in a high-pressure workstation, and after the dilatometer was fixed, a high-pressure chamber head was screwed in until it reached the bottom, with bubbles exhausted.
(8) High-pressure analysis was performed, releasing or tightening a blowoff valve by following instructions.
(9) After the high-pressure analysis was completed, the dilatometer was taken out and cleaned and the test was finished.

In this way, a porosity X of the electrode plate was obtained.

A method for converting the porosity X of the electrode plate into a porosity V of the active substance layer was as follows:

10 portions were randomly selected on a surface of the electrode, and an average thickness of the electrode was measured as H.

The active substance layer on the surface of the electrode was washed with an organic solvent, 10 portions were randomly selected on the surface of the current collector, and an average thickness of the current collector was measured as h.

Porosity $V$ of the active substance layer=porosity $X$ of the electrode×$H/(H-h)$.

Method for Testing Initial Coulombic Efficiency and Capacity Retention Ratio

At 25° C., the lithium-ion battery was charged to a voltage of 4.45 V with a constant current of 1 C, then was charged to a current of 0.05 C with a constant voltage of 4.45 V, followed by recording initial charge capacity; further, and the lithium-ion battery was discharged to a voltage of 3.0 V at a constant current of 1 C so as to obtain discharge capacity, namely initial discharge capacity. The initial discharge capacity/initial charge capacity was the initial coulombic efficiency.

The above steps were repeated 300 times, the $300^{th}$ discharge capacity was recorded, and the $300^{th}$ discharge capacity/initial discharge capacity was the capacity retention rate after the $300^{th}$ cycle.

Method for Testing Volumetric Energy Density

At 25° C., the lithium-ion battery was charged to a voltage of 4.45 V with a constant current of 0.2 C, then was charged to a current of 0.05 C with a constant voltage of 4.45 V, and further was discharged to a voltage of 3.0 V with a constant current 0.2 C, to obtain initial charge capacity, namely battery capacity.

Volumetric energy density (Wh/L)=battery capacity (mAh)×discharge platform (mV)/thickness (mm)/width (mm)/length (mm).

Lithium Plating Test Method

The prepared lithium-ion battery was charged at a high rate of 1 C and charged to achieve 100% of SOC. The battery was disassembled and the negative electrode surface was observed. It was defined as severe lithium plating if there was a dark gray metal layer in more than 50% of the area, it was defined as medium lithium plating if there was a light gray metal layer in 10% to 50% of the area, it was defined as slight lithium plating if there was a light gray metal layer in 5% to 10% of the area, and it was defined as no lithium plating if there was a light gray metal layer below in 5% of the area or there was no light gray metal layer.

Method for Testing Specific Surface Area

Under a low temperature (liquid nitrogen bath) condition, a certain amount of adsorbate gas ($N_2$) was introduced into a sample tube, an adsorption partial pressure was directly obtained by controlling a balance pressure in the sample tube, and adsorption capacity of a partial pressure point was obtained through a gas state equation; adsorption isotherm was obtained by gradually inputting the adsorbate gas to increase an adsorption balance pressure; and desorption isotherm was obtained by gradually extracting the adsorbate gas to reduce the adsorption balance pressure.

Table 1 shows parameters and evaluation results of Examples 1 to 6 and Comparative Example 1, where Examples 2 to 6 and Comparative Example 1 were different from Example 1 only in the preparation of the negative electrode.

TABLE 1

| | Active substance | | | Porous material | | | | | | | | |
|---|---|---|---|---|---|---|---|---|---|---|---|---|
| | Secondary artificial grained graphite | Average particle size μm | Specific surface area m²/g | Meso-carbon microbead | Average particle size μm | Specific surface area m²/g | Binder Styrene-butadiene rubber | Porosity | Ionic conductivity (S/m) | Initial coulombic efficiency | Lithium plating | Energy density Wh/L |
| Example 1 | 98.2% | 17 | 1.3 | 0.5% | 15 | 2.5 | 1.3% | 23% | 0.01 | 92.00% | Medium | 720 |
| Example 2 | 97.7% | 17 | 1.3 | 1.0% | 15 | 2.5 | 1.3% | 25% | 0.015 | 91.20% | Slight | 714 |
| Example 3 | 97.2% | 17 | 1.3 | 1.5% | 15 | 2.5 | 1.3% | 28% | 0.025 | 91.40% | Slight | 715 |
| Example 4 | 94.7% | 17 | 1.3 | 4% | 15 | 2.5 | 1.3% | 32% | 0.035 | 90.80% | No lithium plating | 711 |
| Example 5 | 88.7% | 17 | 1.3 | 10% | 15 | 2.5 | 1.3% | 35% | 0.039 | 89.00% | No lithium plating | 697 |
| Example 6 | 78.7% | 17 | 1.3 | 20% | 15 | 2.5 | 1.3% | 39% | 0.042 | 88.20% | No lithium plating | 690 |
| Comparative Example 1 | 98.7% | 17 | 1.3 | / | | | 1.3% | 20% | 0.008 | 92.40% | Severe | 723 |

Figure 3:
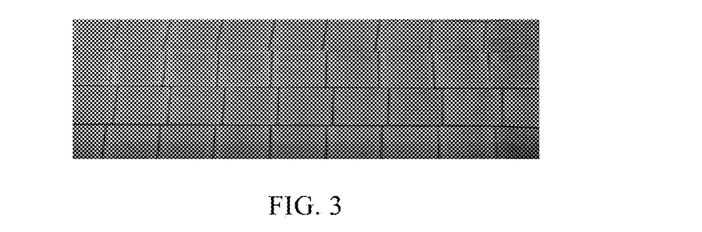
FIG. 3 shows a lithium plating test result of Comparative Example 1.
Figure 4:
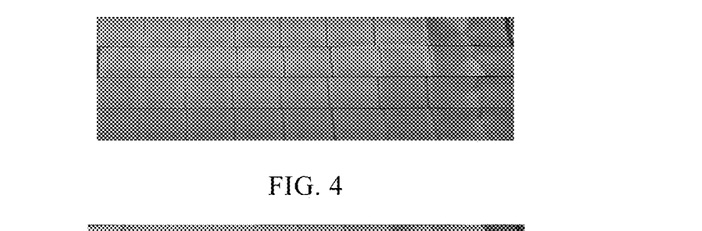
FIG. 4 shows a lithium plating test result of Example 1.
Figure 5:
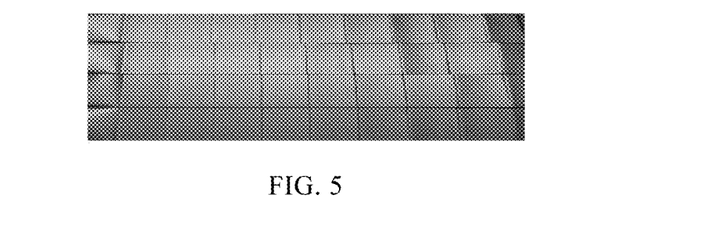
FIG. 5 shows a lithium plating test result of Example 2.

By comparing Examples 1 to 6 with Comparative Example 1, it could be seen that Examples 1 to 6 with ionic conductivity above 0.01 S/m had better lithium plating performance than Comparative Example 1 with lower ionic conductivity, and the safety performance of the electrochemical device was significantly improved. In addition, when the ionic conductivity was increased to above 0.015 S/m (as in Examples 2 to 6), there was no lithium plating or only slight lithium plating, so that the safety performance of the electrochemical device could be ensured in the condition of high-rate charging. FIG. 3 shows a lithium plating test result of Comparative Example 1, FIG. 4 shows a lithium plating test result of Example 1, and FIG. 5 shows a lithium plating test result of Example 2.

In addition, when the porosity of the active substance layer of the negative electrode was in a range of 23% to 40%, both the initial coulombic efficiency and the ionic conductivity of the lithium-ion battery were excellent, and the initial coulombic efficiency was above 90%.

This was because the adding of the porous material provided more permeation channels for the electrolyte in a longitudinal direction of the active substance layer, ensuring that lithium ions might be intercalated from the lateral side. Compared with the intercalation performed only from a parallel surface of the electrode, the intercalation rate of lithium ions was greatly increased, fast intercalation of the lithium ions on a condition of high-rate charging was guaranteed, lithium plating was avoided, and the fast charging performance and safety performance of the lithium-ion battery were significantly improved.

Table 2 shows parameters and evaluation results of Examples 7 to 19, where Examples 7 to 19 were different from Example 1 only in the preparation of the negative electrode.

difference between the active substance and the porous material was favorable to expanding the contact area between the two, and a function of the porous material in conducting the lithium ions to the active substance was fully achieved. Further, by comparing Examples 7 to 8 with Examples 9 to 12, it could be seen that when the ratio of the average particle size of the active substance to that of the porous material was less than or equal to 0.6, the lithium-ion battery had excellent ionic conductivity and lithium plating status. This was because in the process of particle stacking, particles having a certain particle size difference were prone to form a close-stacked structure, especially, large particles of the porous material were prone to be filled and surrounded by the active substance graphite in small particles. Thus, the contact area between the porous material and the active substance was indirectly expanded, and more excellent ionic conductivity and lithium plating status were achieved. Similarly, by comparing Examples 13 to 15 with Examples 16 to 18, it could be seen that when the ratio of the particle size of the active substance graphite to that of the porous material was 1.5 to 2.5, the lithium-ion battery had excellent ionic conductivity and lithium plating status. Particles having a certain particle size difference were prone to form a close-stacked structure, especially, large particles of the active material graphite were prone to be filled by the porous substance in small particles, so that the contact area between the two was indirectly expanded, and more excellent ionic conductivity and lithium plating status were achieved. When the ratio of the particle size of graphite to that of the porous material was further increased, the particle size of the porous material was too small, and the porous material is prone to be agglomerated and fully buried by the particles of the active substance, so that the function of providing pore

TABLE 2

|  | Active substance graphite Average particle size D1/ μm | Porous material Average particle size D2/ μm | D1/D2 | Compacted density g/cc | Ionic conductivity S/m | Specific surface area of negative electrode m²/g | Porosity of negative active substance layer | Initial coulombic efficiency | Lithium plating |
| --- | --- | --- | --- | --- | --- | --- | --- | --- | --- |
| Example 7 | 17 | 21.3 | 0.8 | 1.76 | 0.015 | 0.705 | 20% | 91% | Slight |
| Example 8 | 17 | 25 | 0.68 | 1.76 | 0.018 | 0.742 | 23% | 91.6% | Slight |
| Example 9 | 17 | 30 | 0.57 | 1.76 | 0.028 | 0.964 | 30% | 91.2% | No lithium plating |
| Example 10 | 17 | 43 | 0.4 | 1.76 | 0.034 | 1.004 | 31% | 90.5% | No lithium plating |
| Example 11 | 17 | 57 | 0.3 | 1.76 | 0.039 | 1.092 | 32% | 90.3% | No lithium plating |
| Example 12 | 17 | 85 | 0.2 | 1.76 | 0.040 | 1.103 | 32% | 89.1% | No lithium plating |
| Example 13 | 19 | 5 | 3.8 | 1.76 | 0.02 | 0.709 | 28% | 91.3% | Slight |
| Example 14 | 19 | 5.4 | 3.5 | 1.76 | 0.022 | 0.871 | 28% | 91.3% | Slight |
| Example 15 | 19 | 6 | 3.0 | 1.76 | 0.025 | 0.890 | 30% | 91.3% | Slight |
| Example 16 | 19 | 7.6 | 2.5 | 1.76 | 0.03 | 0.900 | 32% | 91.1% | No lithium plating |
| Example 17 | 19 | 8 | 2.38 | 1.76 | 0.04 | 1.020 | 35% | 91% | No lithium plating |
| Example 18 | 19 | 12 | 1.58 | 1.76 | 0.045 | 1.030 | 37% | 91% | No lithium plating |
| Example 19 | 19 | 14.5 | 1.31 | 1.76 | 0.02 | 0.890 | 30% | 90.8% | Slight |

By comparing Example 1 with Examples 7 to 19, it could be seen that Examples 7 to 19, in which the ratio of the average particle size of the active substance to that of the porous material was less than or equal to 0.8 or was 1.3 to 3.8, had improved ionic conductivity and lithium plating status. This was because an increase of the particle size channels cannot be fully achieved, resulting in the reduction of the ionic conductivity and the deterioration of lithium plating status.

Table 3 shows parameters and evaluation results of Examples 7, and Examples 20 to 24, where the compound represented by formula 1-1 was added in the electrolyte in Examples 20 to 24.

TABLE 3

| | Compound of formula 1-1 content y | Specific surface area S of electrode $m^2/g$ | y × 100/S | Ionic conductivity × S/m | Initial coulombic efficiency | Lithium plating | Capacity retention rate (300cls) |
|---|---|---|---|---|---|---|---|
| Example 7 | 0 | 0.705 | 0 | 0.015 | 91% | Slight | 83% |
| Example 20 | 0.5% | 0.705 | 0.709 | 0.02 | 91% | Slight | 83.6% |
| Example 21 | 1% | 0.705 | 1.418 | 0.027 | 93% | No lithium plating | 88% |
| Example 22 | 2% | 0.705 | 2.837 | 0.033 | 94% | No lithium plating | 88% |
| Example 23 | 2.5% | 0.705 | 3.546 | 0.029 | 96% | No lithium plating | 90% |
| Example 24 | 3% | 0.705 | 4.255 | 0.022 | 91% | Slight | 83% |

When the content of the compound represented by formula 1 and the specific surface area of the electrode satisfied the relationship $1.4 \leq y \times 100/S \leq 3.6$, the ionic conductivity and the initial coulombic efficiency of the lithium-ion battery could be significantly improved, and the lithium plating performance and the capacity retention ratio could be improved. An appropriate amount of compound represented by formula 1 could further form a full solid electrolyte membrane with high ion conduction on the surface of the electrode, thereby further increasing the ionic conductivity and improving the fast charging performance and safety performance. When $y \times 100/S < 1.4$, the content of the compound represented by formula 1 was too small, so that the solid electrolyte membrane with high ion conduction could not be formed sufficiently. When the compound of formula 1 was excessive in content, for example, $y \times 100/S > 3.6$, the formed solid electrolyte membrane was too thick, which was unfavorable to transmission of the lithium ions, resulting in the reduction of the safety performance in fast charging.

The above descriptions are only preferred embodiments of this application and explanations of the applied technical principles. Those skilled in the art should understand that the scope of disclosure involved in this application is not limited to the technical solutions formed by the specific combination of the above technical features, and should also cover other technical solutions formed by any combination of the above technical features or their equivalent features. For example, the technical solution formed by replacement between the above features and the technical features having similar functions disclosed in this application.

What is claimed is:

1. A negative electrode, comprising:
   a current collector;
   and an active substance layer arranged on the current collector, wherein an ionic conductivity of the active substance layer is 0.01 S/m to 1 S/m,
   wherein the active substance layer comprises an active substance and a porous material, a ratio of an average particle size of the active substance to that of the porous material is in a range of 1.3 to 3.8 or less than or equal to 0.8, and the active substance layer has a porosity of 20% to 40%.

2. The negative electrode according to claim 1, wherein the ratio of the average particle size of the active substance to that of the porous material is less than or equal to 0.8.

3. The negative electrode according to claim 2, wherein the ratio of the average particle size of the active substance to that of the porous material is less than or equal to 0.6.

4. The negative electrode according to claim 1, wherein the ratio of the average particle size of the active substance to that of the porous material is 1.3 to 3.8.

5. The negative electrode according to claim 4, wherein the ratio of the average particle size of the active substance to that of the porous material is 1.5 to 2.5.

6. The negative electrode according to claim 2, wherein the negative electrode satisfies at least one of the following conditions:
   an average particle size of the active substance is 15 μm to 70 μm;
   the active substance comprises graphite and/or a silicon-based material;
   an average particle size of the porous material is less than 100 μm;
   the porous material comprises at least one of porous ceramics, activated carbon, meso-carbon microbeads, conductive carbon, or Halloysite nanotubes;
   the content of the porous material is 0.5% to 20% of the active substance layer by mass; and
   a specific surface area of the porous material is greater than 1.5 $m^2/g$.

7. The negative electrode according to claim 4, wherein the negative electrode satisfies at least one of the following conditions:
   an average particle size of the active substance is 15 μm to 70 μm;
   the active substance comprises graphite and/or a silicon-based material;
   an average particle size of the porous material is less than 100 μm;
   the porous material comprises at least one of porous ceramics, activated carbon, meso-carbon microbeads, conductive carbon, or Halloysite nanotubes;
   the content of the porous material is 0.5% to 20% of the active substance layer by mass; and
   a specific surface area of the porous material is greater than 1.5 $m^2/g$.

8. An electrochemical device, comprising the negative electrode according to claim 1.

9. The electrochemical device according to claim 8, wherein the ratio of the average particle size of the active substance to that of the porous material is less than or equal to 0.8.

10. The electrochemical device according to claim 8, wherein the ratio of the average particle size of the active substance to that of the porous material is 1.3 to 3.8.

11. The electrochemical device according to claim 9, wherein the negative electrode satisfies at least one of the following conditions:
- an average particle size of the active substance is 15 μm to 70 μm;
- the active substance comprises graphite and/or a silicon-based material;
- an average particle size of the porous material is less than 100 μm;
- the porous material comprises at least one of porous ceramics, activated carbon, meso-carbon microbeads, conductive carbon, or Halloysite nanotubes;
- the content of the porous material is 0.5% to 20% of the active substance layer by mass; and
- a specific surface area of the porous material is greater than 1.5 m²/g.

12. The electrochemical device according to claim 10, wherein the negative electrode satisfies at least one of the following conditions:
- an average particle size of the active substance is 15 μm to 70 μm;
- the active substance comprises graphite and/or a silicon-based material;
- an average particle size of the porous material is less than 100 μm;
- the porous material comprises at least one of porous ceramics, activated carbon, meso-carbon microbeads, conductive carbon, or Halloysite nanotubes;
- the content of the porous material is 0.5% to 20% of the active substance layer by mass; and
- a specific surface area of the porous material is greater than 1.5 m²/g.

13. The electrochemical device according to claim 8, further comprising an electrolyte, wherein the electrolyte comprises a compound containing a sulfur-oxygen double bond.

14. The electrochemical device according to claim 13, wherein the compound containing a sulfur-oxygen double bond comprises at least one of cyclic sulfate, chain sulfate, chain sulphonate, cyclic sulphonate, chain sulfite, or cyclic sulfite.

15. The electrochemical device according to claim 14, wherein the compound containing a sulfur-oxygen double bond comprises at least one of the following compounds represented by formula 1:

formula 1 wherein W is selected from

L is selected from a single bond or methylene;
m is an integer ranging from 1 to 4;
n is an integer ranging from 0 to 2; and
p is an integer ranging from 0 to 6.

16. The electrochemical device according to claim 15, wherein the compound represented by formula 1 is selected from at least one of the following compounds:

17. The electrochemical device according to claim 13, wherein $1.4 \leq y \times 100/S \leq 3.6$; y is a mass percentage of the compound containing a sulfur-oxygen double bond in the electrolyte, and S is a specific surface area of the negative electrode in m²/g.

18. An electronic device, comprising the electrochemical device according to claim 8.

* * * * *